United States Patent [19]

Van Beek

[11] 4,217,533

[45] Aug. 12, 1980

[54] DEVICE FOR CHARGING ACCUMULATORS

[76] Inventor: Dirk A. Van Beek, Villapark 20, Geldrop, Netherlands

[21] Appl. No.: 884,590

[22] Filed: Mar. 8, 1978

[30] Foreign Application Priority Data

Mar. 8, 1977 [NL] Netherlands ........................ 7702457

[51] Int. Cl.² .............................................. H02J 7/04
[52] U.S. Cl. ...................................... 320/23; 320/32; 320/39
[58] Field of Search ............................. 320/20, 22–24, 320/32, 43, 39, 48, 57, 59

[56] References Cited

U.S. PATENT DOCUMENTS

| 3,217,228 | 11/1965 | Jardine | 320/57 X |
|---|---|---|---|
| 3,688,177 | 8/1972 | Reeves | 320/24 |
| 3,843,918 | 10/1974 | Rhyne | 320/23 |
| 4,061,956 | 12/1977 | Brown et al. | 320/22 |
| 4,087,733 | 5/1978 | Cassagrande | 320/23 X |
| 4,152,635 | 5/1979 | Scott, Jr. | 320/32 X |

Primary Examiner—Robert J. Hickey
Attorney, Agent, or Firm—Pravel, Gambrell, Hewitt, Kirk, Kimball & Dodge

[57] ABSTRACT

A device for charging accumulators or batteries provides a substantially constant charging current for a first charging interval until a voltage level which is less than that of a fully charged accumulator is reached. At this time, the device continues charging in a sequence of subsequent time intervals with charging currents which decrease at different rates in each interval until the accumulator is fully charged. The duration of each of the subsequent time intervals and the rates at which the charging currents decrease may be adjusted to shorten charging time while minimizing gasification of water in the accumulator. The device can also be used to maintain the accumulator charged at a given float voltage.

8 Claims, 5 Drawing Figures

DEVICE FOR CHARGING ACCUMULATORS

BACKGROUND OF INVENTION

The invention relates to a device for charging accumulators (batteries in American idiom) comprising means for charging an accumulator by a charging current in separate, sequential time intervals.

Accumulators involve the problem that in the event of overcharging, that is to say, charging with an excessively high current with an excessively high voltage or for an excessively long time water is separated out in the gaseous form. This problem occurs with an accumulator comprising a liquid electrolyte, for example, the lead-sulphuric acid accumulator generally used in motorcars, the so-called "wet" accumulator as well as in the accumulator comprising a dry electrolyte, the so-called "dry" accumulator.

The decomposition of water into gas in the event of overcharging of the accumulator results in both kinds of accumulators in that the capacity of the accumulator is reduced. With the accumulator having a liquid electrolyte this problem is less serious because the drop in capacity can be compensated for by adding distilled water. With accumulators having a dry electrolyte, however, this problem is onerous because the gasification of water from the accumulator, reducing the capacity, cannot be compensated for by replenishing water or by other measures.

In order to solve this problem it has been suggested for accumulators having a dry electrolyte to charge them with a constant current. An advantage of such a charging system is said to be that, when the accumulator is fully discharged, it can be simply calculated when the charging device has to be switched off; however, with an accumulator in need of charging it is only rarely known to what extent it is discharged.

A disadvantage of this known system is that in an attempt to charge the accumulator having a dry electrolyte within reasonable time by using a comparatively high charging current, overcharging will occur towards the end of the charging operation so that the water decomposes more rapidly. An even greater disadvantage of this system with constant charging current resides in that a high degree of overcharging occurs when the charging device is not switched off in due time.

Even when the accumulator having a dry electrolyte is charged by means of a low charging current, overcharging may nevertheless occur, when the charging current is not switched off in due time, apart from the disadvantage of a very long charging time.

There has furthermore been suggested a device for charging accumulators providing a constant voltage, which device may be constructed in different ways. The advantage of this known device is that the charging current decreases according as the accumulator charge increases so that the risk of overcharging is reduced. Nevertheless failing to switching off the accumulator charging device in due time results also in overcharging and gas development. A further disadvantage resides in that the curve of the charging current and hence the duration of the charging operation can be influenced only with difficulty and overcharging is unavoidable unless very long charging periods are allowed and the charging current is interrupted in due time.

U.S. Pat. No. 3,854,082 discloses an accumulator charging device comprising means for alternately charging the accumulator with a constant charging current for a given first period, during which the terminal voltage of the accumulator rises, and with a decreasing charging current for a subsequent period, during which the terminal voltage remains substantially constant.

A disadvantage thereof is that the initial current intensity, which is in this case the maximum current intensity, is maintained until the desired final voltage of the accumulator is attained, which will certainly result in the development of gas.

A further disadvantage is that the accumulator voltage has to be maintained at the constant high final value for a comparatively long time in order to fully charge the accumulator. It is generally known that gas is always evolved from accumulators when it is held at the final voltage.

A further disadvantage is that only the initial current intensity and the final voltage can be adjusted so that optimum matching of the type of accumulator is out of the question so that with the device disclosed in said patent development of gas cannot be avoided.

Moreover, the circuit arrangement for charging accumulators disclosed in said U.S. Pat. No. 3,854,082 includes, for regulating the charging current, a thyristor element, which has a negative influence on the lifetime of the accumulator, as is known to the average expert in this domain.

SUMMARY OF INVENTION

The present invention has for its object to obviate the disadvantages of the known devices and provides for this purpose a device for charging accumulators characterized in that the initial current intensity of the charging current is maintained only for part of the time required for attaining the desired final voltage of the accumulator by said current intensity and the time derivative (dI/dt) per time interval can be adjusted differently from the time intervals themselves so that an optimum of minimum gas development and of a shortest possible time required for the charging operation is obtained.

The device according to the invention in an advantageous embodiment is characterized in that it comprises means controlled by the terminal voltage of the accumulator for switching off the charging current to the accumulator when the terminal voltage has attained a predetermined value and the accumulator is fully charged and for automatically switching on when the voltage of the accumulator drops below a predetermined value.

A further advantageous embodiment of the accumulator charging device is, in accordance with the invention, provided with means for automatically switching on the charging current to the accumulator when the accumulator is connected.

According to the invention an embodiment of the accumulator charging device comprises a voltage-controlled current source, to the output of which can be connected one terminal of the accumulator, a voltage follower, the input of which is formed by said one terminal of the accumulator and the output of which is connected to a voltage divider, the other terminal of which is connected to the other terminal of the accumulator, a plurality of operational amplifiers, which are fed back on the inverting input and of which the non-inverting inputs are connected to the respective tappings of the voltage divider and the inverting input is connected through a resistor to a common reference voltage source, an operational amplifier fed back at the non-inverting input, the non-inverting input of which is connected to a corresponding tapping of the voltage divider and the inverting input of which is directly connected to the common reference voltage source, and a plurality of series networks corresponding with the total number of operational amplifiers, each network comprising a rectifier and a resistor, one terminal of each of which is connected to the output of one of the operational amplifiers and the other terminal of each of which is connected to the input of the voltage-controlled current source.

A preferred embodiment of the accumulator charging device in accordance with the invention comprises a voltage-controlled current source, to the output of which can be connected one terminal of the accumulator, a voltage follower, the input of which is formed by said one terminal of the accumulator and the output of which is connected to a voltage divider, the other terminal of which can be connected to the other terminal of the accumulator, a plurality of operational amplifiers, which are fed back at the inverting inputs and the non-inverting inputs of which are connected to the respective tappings of the voltage divider and the inverting input is connected through a resistor to a common reference voltage source, an operational amplifier fed back at the non-inverting input, the non-inverting input of which is connected to a corresponding tapping of the voltage divider and the inverting input of which is directly connected to the common reference voltage source, a number of series networks corresponding with the total number of operational amplifiers, each network, with the exception of one, consisting of a rectifier and a resistor, a terminal of each of which is connected to the output of one of the operational amplifiers and the other terminal of each of which is connected to the input of a voltage-controlled current source and a series network consisting of a rectifier, one terminal of which is connected to the output of an operational amplifier fed back at the inverting input and the other terminal of which is connected to the junction of the rectifier and the resistor of the series network, which is connected to the operational amplifier fed back at the non-inverting input so that the device can operate as a "stand-by" device for charging accumulators.

BRIEF DESCRIPTION OF THE DRAWINGS

The accumulator charging device according to the invention will now be described with reference to embodiments shown in the drawings.

DESCRIPTION OF PREFERRED EMBODIMENTS

Figure 1:
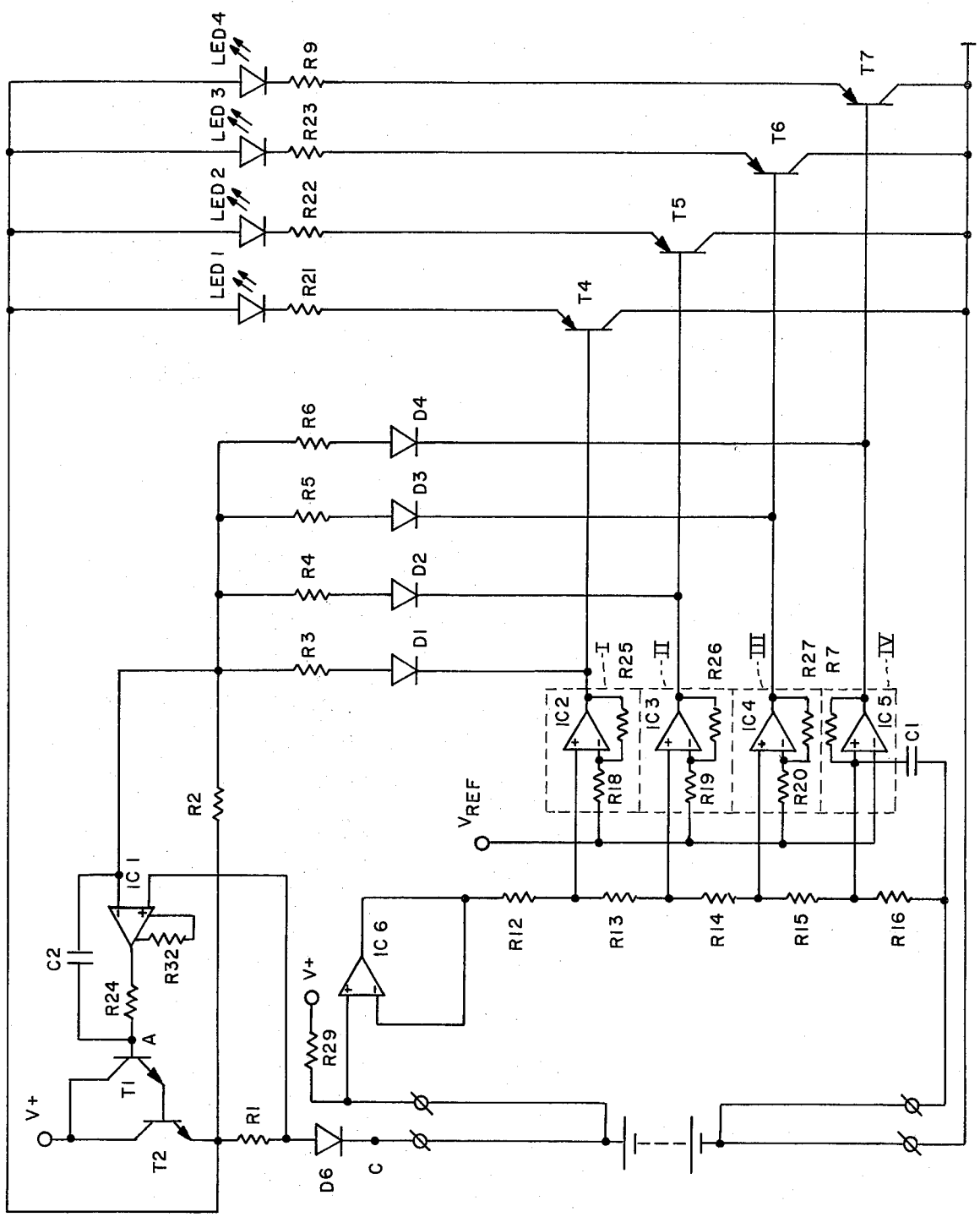
FIG. 1 illustrates a circuit diagram of a device for charging accumulators in accordance with the invention.

Referring to FIG. 1, the accumulator charging device according to the invention comprises a voltage-controlled current source with the operational amplifier IC1, the transistors T1 and T2, the resistors R1, R2, R24 and R32. The inverting input of the operational amplifier IC1 is connected to the junction of the resistors R2, R3, R4, R5 and R6. The non-inverting input of the operational amplifier IC1 is connected to the junction of the resistor R1 and the diode D6. Across an "off-set" input and the grounded supply input of the operational amplifier IC1 is arranged a resistor R32. The output of the operational amplifier IC1 is connected through the resistor R24 to the base of transistor T1, the emitter of which is connected to the base of T2 and the collector of which is connected to the collector of transistor T2, which is connected to the positive supply voltage V+, whereas the emitter of T2 is connected to the junction of the resistors R1, R2 and the junction of the light-emitting diodes LED1, LED2, LED3 and LED4. Moreover, a capacitor C2 is connected between the inverting input of the operational amplifier IC1 and the junction of resistor R24 and the base of transistor T1. The diode D6 is connected on one side to the non-inverting input of the operational amplifier IC1 and to the resistor R1 and on the other side to the positive terminal of the accumulator. The inverting input of the voltage follower IC6 is connected to the junction of resistor R12 and the output of voltage follower IC6. The non-inverting input of voltage follower IC6 is connected to the junction of the positive terminal of the accumulator and the resistor R29, which is connected on the other side to the positive supply voltage. Between the output of the voltage follower and the negative terminal of the accumulator is connected a series combination of the resistors R12, R13, R14, R15 and R16. To the respective tappings of the voltage divider formed by the resistors R12, R13, R14, R15 and R16 are connected the non-inverting inputs of the respective operational amplifiers IC2, IC3, IC4 and IC5. The inverting inputs of the operational amplifiers IC2, IC3 and IC4 are connected through the respective resistors R18, R19 and R20 to a reference voltage source. The inverting input of the operational amplifier IC5 is directly connected to the reference voltage source. The outputs of the operational amplifiers IC2, IC3, IC4 are fed back through the respective resistors R25, R26 and R27 to the inverting inputs. The output of the operational amplifier IC5 is fed back through resistor R7 to the non-inverting input of IC5. The outputs of the operational amplifiers IC2, IC3, IC4 and IC5 are furthermore connected to the diodes D1, D2, D3 and D4 respectively and to the bases of the respective transistors T4, T5, T6 and T7. The other terminals of the diodes D1, D2, D3 and D4 are connected through the resistors R3, R4, R5 and R6 respectively to the junction of the resistor R2 and the inverting input of the operational amplifier IC1. To the junction of the non-inverting input of IC5, resistor R7 and the tapping of the voltage divider is connected a capacitor C1, the other terminal of which is connected to the negative terminal of the accumulator. The collectors of the transistors T4, T5, T6 and T7 are connected to the negative terminal of the accumulator. The emitters of the transistors T4, T5, T6 and T7 are connected by way of the respective series combinations of the light-emitting diodes LED1, LED2, LED3 and LED4 and the corresponding resistors R21, R22, R23 and R9 to the emitter of the transistor T2.

Figure 2:
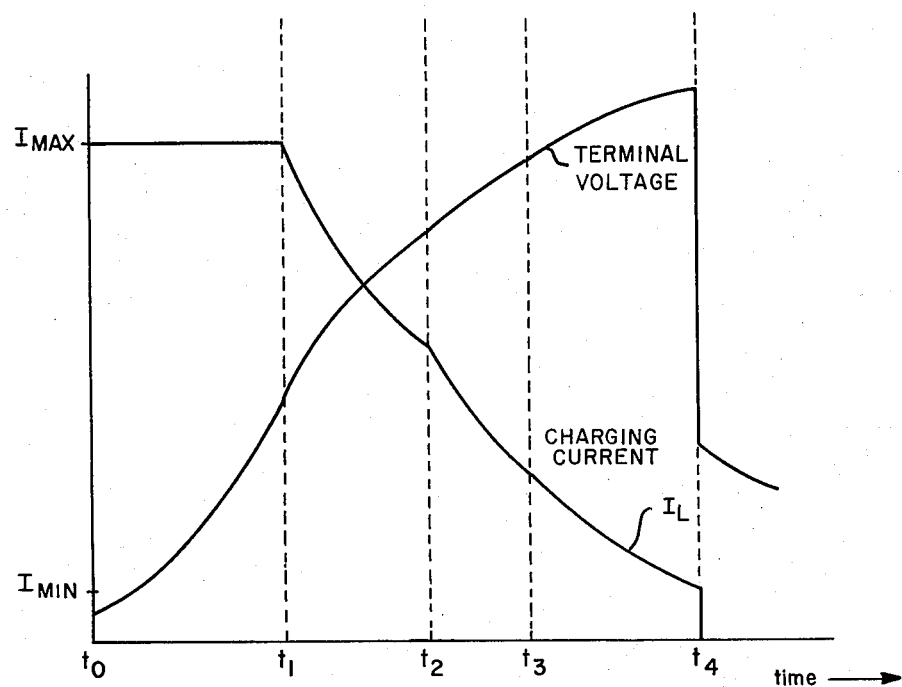
FIG. 2 is a graph of the charging current and the terminal voltage as a function of time during charging of the accumulator by the device having the circuit diagram of FIG. 1.
Figure 5:
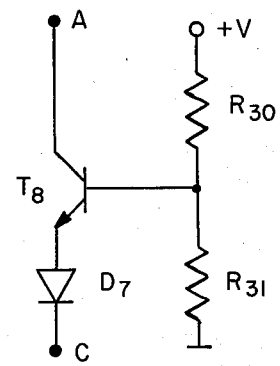
FIG. 5 shows an additional circuit arrangement associated with the embodiments of FIGS. 1 and 3 for obtaining a permanent shortcircuit safety and a protection against erroneous connection of the accumulator.

Referring to FIGS. 1, 2 and 5 the operation of the accumulator charging device embodying the invention will be described more fully.

Around the operational amplifier IC1 is built up the voltage-controlled current source, which furthermore comprises the resistors R1, R2, R24, R32 and the transistors T1 and T2. Because the accumulator voltage increases only slightly during charging (less than 5% per time interval, see FIG. 2), the voltage of the accumulator may serve as a reference voltage for the current source. Together with the resistors R3, R4, R5 and R6 the resistor R2 constitutes a voltage divider so that a given voltage will appear at resistor R2. The operational amplifier IC1 renders the transistors T1 and T2 conducting to an extent such that the voltage across the resistor R1 is equal to the voltage across the resistor R2 so that the accumulator is charged by a current determined by the voltage at the resistor R2.

The operational amplifier IC6 maintains the voltage of the voltage divider of resistors R12 to R16 equal to the terminal voltage of the accumulator.

The network formed by the operational amplifier IC2 and the resistors R18 and R25 constitutes a difference amplifier I having a difference amplification equal to 1 plus the value of R25 divided by that of R18. Likewise the operational amplifier IC3 with the resistors R19 and R26 constitutes a difference amplifier II and the operational amplifier IC4 with the resistors R20 and R27 constitutes a difference amplifier III. The non-inverting input and the output of the respective difference amplifier I, II and III are identical to the non-inverting input and the output of the respective operational amplifiers IC2, IC3 and IC4. The inverting inputs of the difference amplifiers I, II and III are formed by the resistors R18, R19 and R20 respectively. The non-inverting input of each difference amplifier is controlled through the voltage divider and the operational amplifier IC6 by the voltage at the positive terminal of the accumulator. The inverting input of each difference amplifier is connected to the reference voltage. If the voltage at the non-inverting input of the difference amplifier differs by $\delta V$ from the voltage at the inverting input (the reference voltage), the output voltage of the difference amplifier will differ by $A \times \delta V$ from the reference voltage, in which A is the adjusted amplification of the difference amplifier. However, if the voltage at the output of the difference amplifier assumes the value of the positive supply voltage or is grounded, a further increase or decrease respectively of the voltage at the non-inverting input of the difference amplifier will no longer affect the output voltage. The operational amplifier IC5 is connected as a Schmitt trigger and has no other function than the automatic connection and disconnection of the accumulator charging device.

At the beginning of the charging process the terminal voltage of the accumulator will be so low that the outputs of the four operational amplifiers IC2, IC3, IC4 and IC5 are low. Therefore, the voltage across the resistor R2 is comparatively high and the accumulator charging device will supply the highest charging current. The terminal voltage of the accumulator will increase so that at a given instant the difference between the plus input of the difference amplifier I and the reference voltage becomes so small that the voltage at the output of the difference amplifier will rise. The voltge across the resistor R2 becomes lower and the charging current will decrease. This occurs at the instant t1 indicated in FIG. 2, in which the charging current and the terminal voltage of the accumulator are plotted as a function of time during the charging process. During this drop in charging current it applies that an increase in terminal voltage of the accumulator is proportional to the increase in voltage at the positive input of the difference amplifier, which is again proportional to an increase in voltage at the output of the difference amplifier. This voltage increase is proportional to a decrease in the voltage across the resistor R2 and hence proportional to the decrease in charging current. Recapitulating, an increase in terminal voltage of the accumulator results in a proportional decrease in charging current determined by the ratio between the resistance values of R18 and R25. The overall decrease in charging current during the time interval t1—t2 is determined by resistor R3. When the terminal voltage of the accumulator has risen to an extent such that the voltage at the output of difference amplifier I exceeds the voltage at the junction of the resistors R2, R3, R4, R5 and R6, the diode D1 will block and the difference amplifier I with resistor R3 and diode D1 will no longer affect the correct choice of the resistors R12 to R16 and R18 to R20, since when diode D1 blocks, the voltage at the plus input of difference amplifier I will simultaneously be so high that the voltage at the output of the difference amplifier will increase and the charging current continues dropping. However, the relation between the terminal voltage of the accumulator and the charging current is determined by the resistors R19 and R26, whereas the total decrease in charging current during the time interval t2—t3 is determined by the resistor R4. During the periods t2—t3 and t3—t4 the process described above will be repeated for the difference amplifiers II and III. When finally diode D3 starts blocking, the charging current has dropped to a value $I_{min}$ (FIG. 2) and with a correct adjustment of the voltage divider formed by the resistors R12, R13, R14, R15 and R16 the voltage at the plus input of the operational amplifier IC5 will become equal to the voltage at the minus input. The output voltage of the operational amplifier IC5 becomes higher. The feedback across the resistor R7 results in an avalanche effect and the output voltage will rise very rapidly to the maximum value. The voltage across the resistor R2 is then zero Volt and as a result of the "off-set" compensation by means of the resistor R32 the output voltage of the operational amplifier IC1 is low and the transistors T1 and T2 are blocked. The charging device is switched off and to the positive terminal of the accumulator is now fed through the resistor R29 only a voltage which is lower than or equal to the self-discharge of the accumulator. Since the resistor R7 is directly connected to the voltage divider formed by the resistors R12 to R16, the adjustment of the voltage divider will change, subsequent to the disconnection of the charging device, in a manner such that the charging device is switched on not until the voltage of the accumulator has dropped below a threshold value to be adjusted by resistor R7. This voltage may be chosen so that the charging device switches on not until the accumulator has discharged to a given percentage lying between "just above 0%" and "just below 100%". The capacitor C1 prevents premature connection and disconnection of the charging device due to an interference pulse at the supply line. Before the charging device can switch off due to an interference pulse, the capacitor has to be charged until its voltage is equal to the reference voltage. However, when the capacitor voltage becomes equal to the reference voltage because the accumulator is fully charged, the capacitor voltage need rise by only a few ten microvolts owing to the high open-loop amplification of the operational amplifier IC5 in order to cause the operational amplifier IC5 connected as a Schmitt trigger to change over. Thus the requirement is satisfied that the charging device should switch off more rapidly than the terminal voltage of the accumulator drops due to a decreasing charging current, but should not switch off in the event of interference pulses at the supply lead. A premature switching on of the charging device due to interference pulses is avoided in a similar manner.

Figure 3:
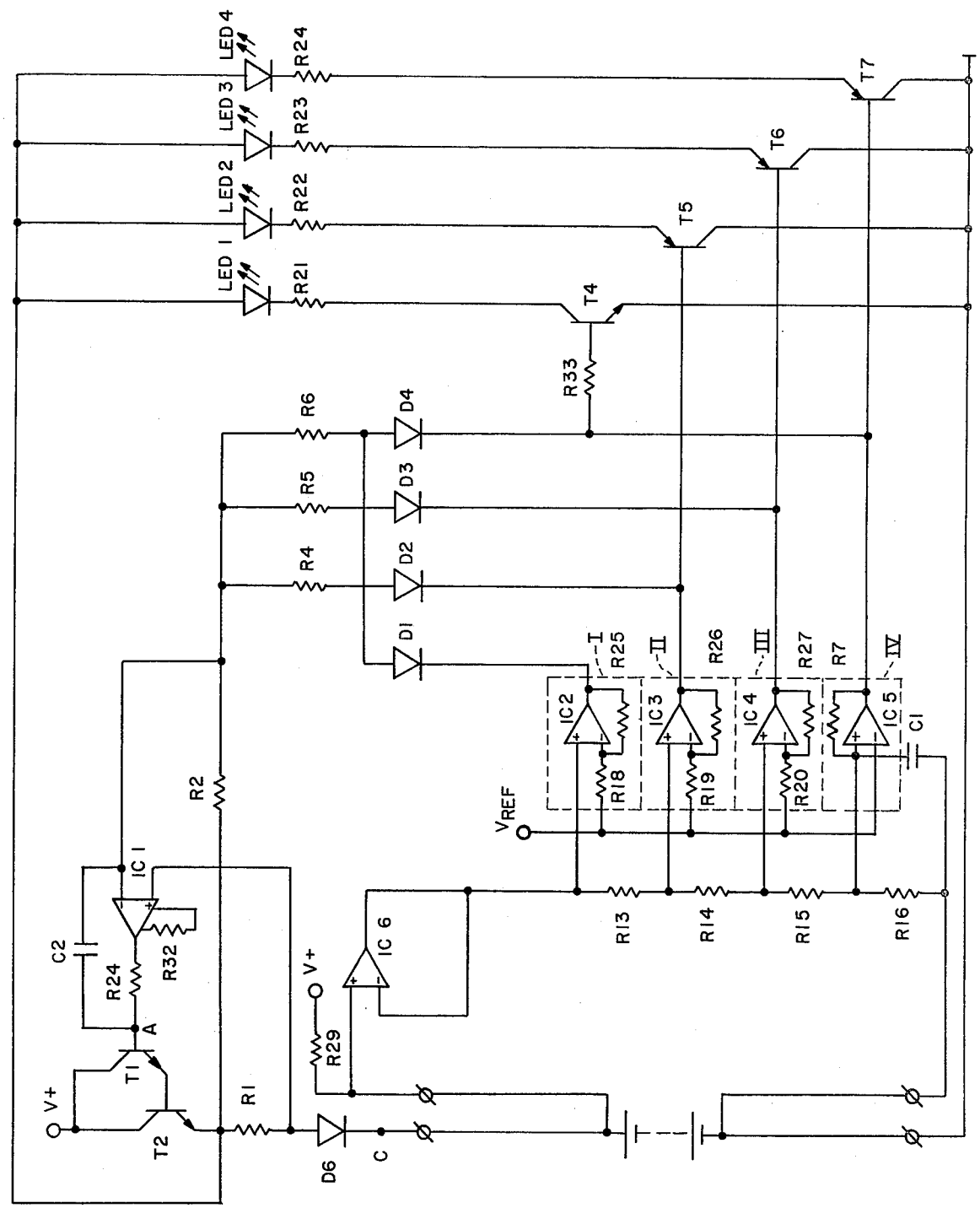
FIG. 3 shows a preferred embodiment.

In the circuit diagram of FIG. 3 the resistor R29 serves for maintaining the voltage at the input of the voltage follower IC6 high, when the accumulator is disconnected from the charging device. As a result the voltage at the voltage divider R12 to R16 and the outputs of the operational amplifiers I to IV are high. Consequently the charging device is switched off, the output voltage of the operational amplifier IC1 is low and all light-emitting diodes LED1 to LED4 are quenched.

Figure 4:
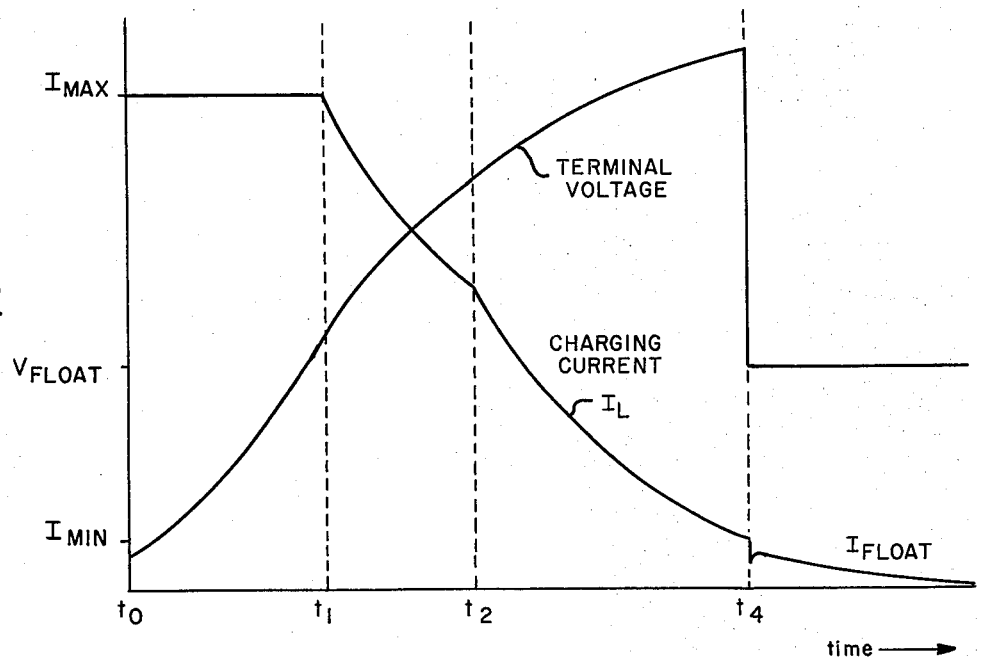
FIG. 4 illustrates an example of a graph associated with the embodiment of FIG. 3.

Referring to FIGS. 3, 4 and 5 the operation of the preferred embodiment of FIG. 3 will now be described.

FIG. 3 illustrates a preferred embodiment of the charging device in accordance with the invention. This preferred embodiment largely corresponds with the embodiment of FIG. 1, but there are essential differences.

The circuit arrangement of FIG. 3 can be obtained by a minimum number of modifications from the circuit arrangement of FIG. 1. In FIG. 3 the resistor R12 is short-circuited so that the voltage at the non-inverting input of IC2 is directly connected to the output of the voltage follower IC6. The resistor R3 in the circuitry of FIG. 1 is removed in the circuit of FIG. 3 and the anode of diode D1 is instead connected to the junction of R6 and the anode of D4. In FIG. 3 the diode D1 is connected by the cathode of the fed-back output of the difference amplifier I and by the anode to the junction of resistor R6 and the anode of diode D4, while the resistor R3 is removed.

The advantage of the circuitry of FIG. 3, which represents a preferred embodiment of the invention, is that by these minimal changes the accumulator charging device can operate as a "stand-by" device, by means of which the accumulator can at any time supply its full capacity, since the fully charged accumulator is maintained at a given "float" voltage. Provided the float voltage is chosen so as not to be too high, which is generally known from prior literature, the device of FIG. 3 does not in any respect adversely affect the lifetime of the accumulator. The positive aspect of the float voltage is that internal discharge of the accumulator is compensated for, which results in that the accumulator has its full capacity available at any time.

If the accumulator charging device should operate as a "stand-by" device, so that it is connected as illustrated in FIG. 3, the reference voltage applied via the resistors R18, R19 and R20 to the inverting input of the respective difference amplifiers I, II and III and directly applied to the inverting input of Schmitt trigger IC5 is chosen to be equal to the "float" voltage associated with the accumulator (see FIG. 4). During the period of t0—t4 indicated in FIG. 4 the output voltage of the Schmitt trigger IC5 will be low so that also the voltage at the anode of the diode D4 will be low. Owing to the diode D1 the output voltage of difference amplifier I has no influence on the charging current $I_L$ during the time intervals t0—t1, t1—t2 and t2—t4.

However, when the output voltage of the Schmitt trigger IC5 has become high (after the instant t4), the diodes D2, D3 and D4 will block so that an output voltage of difference amplifier I will have an influence on the charging current $I_L$. Through the feedback resistor of Schmitt trigger IC5 a current will flow to the junction of the resistors R15 and R16 of the voltage divider so that the adjustment of the voltage divider R13 to R16 changes in a manner such that the charging device switches on not until the accumulator voltage has dropped below a threshold value, which can be adjusted by said feedback resistor R7. The non-inverting input of the difference amplifier I is, however, directly connected to the output of the voltage follower IC6 so that the modified adjustment of the voltage divider R13 to R16 does not affect the difference amplifier I.

Immediately after the instant t4 the accumulator voltage will exceed the float voltage $V_{float}$ (see FIG. 4) and thus also exceed the reference voltage $V_{ref}$. The output voltage of difference amplifier I is then high and no current is any longer fed to the accumulator. If the accumulator voltage drops slightly below the voltage $V_{float}$, which is equal to $V_{ref}$, the output voltage of difference amplifier I will become slightly lower so that a slight charging current will be fed to the accumulator.

The amplification factor of difference amplifier I is adjusted at a very high value by means of the resistors R25 and R18 so that only a small drop dV of the accumulator voltage results in the output voltage of difference amplifier I becoming low and a charging current $I_{min}$ (see FIG. 4) being applied to the accumulator.

A state of equilibrium will be established, in which it applies that O < charging current to accumulator $< I_{min}$ and $V_{float} - dV < V_{accu} < V_{float}$.

In an accumulator having a nominal voltage of 12 V $V_{float}$ may, for example, be 13.6 V and $V_{ref}$ is then also 13.6 V. dV may be 10 mV.

If the accumulator is discharged with a higher current value than $I_{min}$ due to external load, the "stand-by" charging device will supply a current $I_{min}$ to the accumulator. When the accumulator voltage then drops below a threshold value adjusted by the feedback resistor R7, the charging device will switch on again and supply the maximum charging current $I_{max}$.

By adding two diodes $D_{1x}$ and $D_{1y}$ to the circuitry of FIG. 3 that is to say, $D_{1x}$ between the output of difference amplifier I and the junction of resistor R5 and the diode D3 and $D_{1y}$ between the output of difference amplifier I and the junction of resistor R4 and diode D2, the charging device can supply the maximum charging current $I_{max}$ at the float voltage, which may be necessary when the accumulator has to supply high currents to an external load.

The charging device continues to supply the float voltage and thus compensates the discharging current of the accumulator and will not change over to the higher charging voltage. The effect of the diodes $D_{1x}$ and $D_{1y}$ is similar to that of the diode D1 described above.

The circuitry of FIG. 3 has the advantage that the charging device is suitable both for "cycle" operation and "stand-by" operation.

It will be obvious that by the connection as a "stand-by" device the possibilities in choosing the number of intervals with a given number of operational amplifiers, in this case IC2 to IC5, is reduced by one step. However, there is no requirement with respect to a definite number of operational amplifiers, since this number may be extended to 5 or 6, for example, so that by this circuitry the charging curve can be adjusted with even greater accuracy so that the optimum of a minimum development of gas and of a shortest possible duration of the charging process can be further approached.

If desired, the accumulator charging device may be equipped with light-emitting diodes in order to visualize the charging process. During the charging process by the circuitry of FIG. 1 the three emitter followers formed by the transistors T4, T5 and T6 bring about a uniform decrease in light intensity (down to extinction) of the light-emitting diodes LED1, LED2 and LED 3 in this order of succession. The light-emitting diode LED4 indicates whether the charging device is on or off. Moreover, it can be concluded from the number of luminescing diodes and from their light intensity to what extent the accumulator is charged.

In the case of the "stand-by" device (FIG. 3) the two emitter followers formed by transistors T5 and T6 will ensure during the charging process a uniform diminution of the light intensity (to extinction) of the light-emitting diodes LED2 and LED 3. When the accumulator is charged (t4), LED4 luminescing upon the connection of the stand-by device (t0) will die out and at the same time LED1 will luminesce, which indicated that the accumulator is fully charged and has gone over to the "float" voltage.

In contrast to the circuitry of FIG. 1 LED1 in the circuitry of FIG. 3 indicates that the accumulator is fully charged and has changed over to "float" voltage. In this case it is particularly convenient to choose for LED1 a colour differing from that of the LED's 2, 3 and 4; for example, LED1 may be green and LED 2, 3 may be red. When the accumulator is disengaged from the charging device, LED1 will extinguish.

The light-emitting diode LED1 and the associated resistor R21 and the transistor T4 in the circuitry of FIG. 3 are mounted in a slightly different way than in the circuitry of FIG. 1. In the circuitry of FIG. 1 the base of transistor T4 is directly connected to the output of difference amplifier I, whereas the base of transistor T4 in the circuitry of FIG. 3 is connected through a resistor R33 to the output of Schmitt trigger IC5. Moreover, the transistor T4 of FIG. 1 is of the pnp-type, whereas transistor T4 of FIG. 3 is of the npn-type.

The LED's do not luminesce at a short-circuit of the output of the charging device, nor when the accumulator is erroneously connected.

The charging device can be rendered permanently resistant to short-circuit in a simple manner, which is in addition a safeguard against erroneous connection of the accumulator and the connection of accumulators of too low a nominal voltage. This additional circuit is shown in FIG. 5 and may be included in the diagrams of FIG. 1 and FIG. 3 between the points A and C. By the resistors R39 and R31 the voltage at the base of transistor T8 is adjusted at a given value. When the voltage at the emitter of transistor T8 becomes lower than the adjusted base voltage due to short-circuit, to erroneous connection of the accumulator or to the connection of an accumulator having too low a nominal voltage, transistor T8 will become conducting. The total voltage across the Diode D6, the resistor R1 and the two base-emitter junctions in the Darlington combination formed by the transistors T1 and T2 (see FIGS. 1 and 3) becomes lower than about 0.9 V so that the transistors T1 and T2 become non-conducting. The diode D7 protects the base-emitter junction of the transistor T8 against excessively high negative voltages.

An advantage obtained by the charging device according to the invention is that for each type of accumulator the ideal curve of the charging current and the charging voltage can be approached very closely so that the lifetime of the accumulator is considerably prolonged since only a very small quantity of gas is developed during the charging process carried out in accordance with the correct charging curve.

A further important advantage of the charging device according to the invention is that, when the accumulator is charged, the charging device switches off the charging current. This is important because a charging current of, for example, only a few mAmps finally results in overcharging and gas evolution. An additional advantage resides in that the charging device automatically switches on when the terminal voltage of the accumulator has dropped below a predetermined value.

Further advantages of the charging device according to the invention are that it is permanently resistant to short-circuits, the accumulator may be erroneously connected with the risk of damage of the accumulator or of the charging device and the operation of the charging device is practically independent of the length of the connecting wires because the accumulator voltage is scanned with the aid of two separate wires traversed by a very low current.

The charging device according to the invention can be very advantageously employed for accumulators having a solid or pasty electrolyte and as well as for accumulators having liquid electrolyte, in practice, for example, for the so-called "dry" accumulator, the "vented" nickel-cadmium accumulator, and the lead - sulphuric acid accumulator.

I claim:

1. A device for charging accumulators comprising;
   input means for removable conductive connection to an accumulator to be charged for sensing the terminal voltage thereof;
   initial charging means conductively connected to said input means to supply a substantially constant dc-charging current to the accumulator in response to the initially sensed terminal voltage during a first charging interval until a predetermined voltage level is attained as the sensed terminal voltage such predetermined voltage level being substantially lower than a voltage level for said accumulator when fully charged;
   sequential charging means conductively connected to said input means for further charging said accumulator in a predetermined number of subsequent different time intervals subsequent to said first charging interval with differently decreasing dc-charging currents in each time interval, respectively, and said sequential charging means including means for mutually independently setting both each time interval and the decreasing rate of each decreasing dc-charging current to permit a minimum gasification of water from the accumulator and a minimum duration charging time.

2. A device as claimed in claim 1 wherein said input means comprises:
   switching means for automatically switching on the initial constant dc-charging current from said initial charging means when the sensed terminal voltage thereof is below a predetermined voltage level.

3. A device as claimed in claim 1 or 2 wherein said input means further comprises:
switching means for switching off the final decreasing charging current to the accumulator in a last time interval of the subsequent time intervals of said sequential charging means when said sensed terminal voltage thereof has attained a predetermined value indicating that the accumulator is fully charged.

4. A device as claimed in claim 3 further comprising:
float charging means to supply a substantially constant float voltage to the charged accumulator after switching off the final decreasing charge current by said switching means.

5. A device as claimed in claims 1 or 2 wherein said charging means comprise:
a voltage-controlled current source, the output of which can be connected to one terminal of the accumulator;
a voltage follower, the input of which is formed by said one terminal of the accumulator;
a voltage divider connected to the output of said voltage follower;
the other terminal of said voltage follower connected to the other terminal of the accumulator;
a plurality of operational amplifiers which are fed back at their inverting inputs;
the non-inverting inputs of said plurality of operational amplifiers being connected to their respective tappings of said voltage divider;
a common reference voltage source:
a resistor connecting the inverting inputs of said plurality of operational amplifiers to said voltage source;
an operational amplifier fed back at its non-inverting input, and having said non-inverting input connected to a corresponding tapping of and having said voltage divider and its inverting input directly connected to said common reference voltage source; and
a number of series networks corresponding in number to said plurality of operational amplifiers, each of which networks includes a rectifier and a resistor, one terminal of each of which is connected to the output of one of said plurality of operational amplifiers and the other terminal of each of which is connected to the input of said voltage-controlled current source.

6. A device as claimed in claim 5, further including:
a series of network of:
a rectifier, one terminal of which is connected to the output of one of said plurality of operational amplifiers fed back at it inverting input;
the other terminal of said rectifier being connected to the junction of one of said rectifiers and said resistors of said series network.

7. A device as claimed in claim 1 further comprising:
indication means to visibly distinguishably indicate the mode of operation of said device.

8. A device as claimed in claim 7, wherein said indication means comprises:
a plurality of LED's corresponding in number to the first interval and the number of subsequent time intervals, said LED's being initially illuminated and during the progression of said charging intervals successively extinguishing to indicate the progress of charging by the device.

* * * * *